United States Patent [19]
Horadan et al.

[11] Patent Number: 5,842,211
[45] Date of Patent: Nov. 24, 1998

[54] METHOD AND SYSTEM FOR TRANSFERRING A BANK FILE TO AN APPLICATION PROGRAM

[75] Inventors: Peter H. Horadan, Kirland; Richard A. Vaughan, Seattle; Matthew L. Cone, Bellevue, all of Wash.

[73] Assignee: Microsoft Corporation, Redmond, Wash.

[21] Appl. No.: 818,202

[22] Filed: Mar. 14, 1997

Related U.S. Application Data

[60] Provisional application No. 60/013,482 Mar. 15, 1996.
[51] Int. Cl.$^6$ ..................................................... G06F 17/30
[52] U.S. Cl. ..................................... 707/10; 707/1; 707/9; 705/43; 395/187.01; 395/200.33; 395/200.89
[58] Field of Search .......................... 455/3.1; 379/93.12, 379/91.01; 395/187.01, 114, 186, 200.33, 200.59; 380/23, 24, 28, 49, 4; 370/465; 382/115; 235/379; 283/101; 361/683; 704/275; 705/43; 707/10, 1, 9

[56] References Cited

U.S. PATENT DOCUMENTS 5,655,008  8/1997  Futch et al. ............................ 379/91.01
5,778,173  7/1998  Apte ..................................... 395/187.01

*Primary Examiner*—Thomas G. Black
*Assistant Examiner*—Diane D. Mizrahi
*Attorney, Agent, or Firm*—Jones & Askew

[57] ABSTRACT

An improved method of importing a bank file from a financial institution's computer to an application program without user intervention. A local program obtains a bank file from the financial institution's server. A second file based on the bank file is created by the server associated with the financial institution. The local program writes the second file to the disk of the local storage medium and then invokes a "Shell_Execute" API from the operating system. The application program automatically, without user intervention, transfers the file directly from the local storage medium into the application program. The local program may be a web browser. The bank file that is displayed to the user via the web site may include a button on the user's screen that is a link on the bank's server that points to the file. If the user selects the button associated with the link, the web browser automatically invokes the "Shell_Execute" API and the application program is invoked and the file is imported directly to the application program, thus bypassing the local storage medium.

19 Claims, 3 Drawing Sheets

METHOD AND SYSTEM FOR TRANSFERRING A BANK FILE TO AN APPLICATION PROGRAM

CROSS-REFERENCE TO RELATED APPLICATION

This application claims the benefit of U.S. Provisional Application Ser. No. 60/013,482 filed Mar. 15, 1996.

TECHNICAL FIELD

The present invention relates generally to on-line services and, more specifically, to the importation of a file containing financial information from a financial institution to an application program.

BACKGROUND OF THE INVENTION

The increasing use of wide area networks such as the Internet has resulted in the availability of many on-line services. Computer users can access many services by utilizing a wide area network to establish a connection with other computers connected to the network.

The Internet, which represents a distributed computer network, is a worldwide network of computers belonging to various entities such as corporations, institutes of learning, and research organizations. The computers are connected by gateways that handle data transfer and conversion of messages from a sending network to the protocols used by a receiving network. The Internet is a collection of networks and gateways that use the TCP/IP suite of protocols. TCP/IP is an acronym for Transport Control Protocol/Interface Program, a software protocol developed by the Department of Defense for communications between computers.

Typically, the computers connected to a wide area network such as the Internet are identified as either servers or clients. A server is a computer that stores files that are available to other computers connected to the network. A client is a computer connected to the network that accesses shared resources provided by a server. To obtain information from a server, a client makes a request for a file or information located on the server using a specified protocol. Upon reception of a properly formatted request, the server downloads the file to the client.

The world wide web is a specific Internet network using specified Internet protocols. As is well known to those skilled in the art, communications between computers on the world wide web use the HTTP protocol. Files on a web server are identified by a universal resource locator (URL). A URL is a format for describing files on a server and describes both the name of the server and the path to the file on the server. For example, a URL for a web server may be constructed as follows: "http://<server>/<filepath>", where <server> identifies the server on which the file is located and <filepath> identifies the path to the file on the server. By knowing the name of the server and the correct file path to a file, a properly formatted URL can be created to allow a user to access any desired file on a server connected to the world wide web.

In connection with wide area networks such as the Internet, application programs are available for client computers to support specific types of on-line services. For example, there are a number of commercially available application programs that support on-line banking services between financial institutions and their customers. These services may include on-line bill payment capabilities that enable a user to write electronic checks and to send them to a processor for payment. The on-line services may also include on-line banking that enables a user to download account information such as balances, statements, to transfer funds between accounts, and apply for personal and secured loans.

Personal finance application programs allow a user to establish a connection between the user's computer (the client) and a computer at any of a large number of financial institutions that support on-line services. There are many different ways to establish a connection between the user's computer and the financial institution, and each individual financial institution determines the method by which a user may establish a connection However, not all financial institutions permit these connections or support on-line services. Typical application programs obtain information regarding the identity of the financial institutions that support on-line services as well as the connection method required by each financial institution in various ways, as is discussed further below.

Service providers for establishing connections with financial institutions currently exist, such as Intuit Services Corporation (ISC) and Visa Interactive. These two service providers have their own protocols and a personal finance application program that utilizes one of these service providers must include a driver that allows the application program to connect to and utilize the service provider. A personal finance application program may also include a driver that allows the application program to connect to and utilize another service provider, such as BTX or Minitel. BTX and Minitel are service providers for institutions in Germany and France, respectively.

FIGS. 1A and 1B are block diagrams showing the implementation of on-line banking services using the ISC and Visa Interactive service providers 2 and 3, respectively. An application program 4 connects to a service provider by calling a local node of a wide area network 5 which is connected to the service provider. For example, FIG. 1A shows how the application program 4 connects to the ISC service provider 2 using ISC driver 6 within the application program to access on-line services at various banks connected to the service provider. Similarly, FIG. 1B shows how the application program 4 connects to the Visa Interactive service provider 3 using the Visa Interactive driver 7 within the application program. The driver would be loaded by the application program when the application program desires to use the service provider to connect to one of the various banks.

As is well known to those skilled in the art, a driver is a program that communicates with another device to control or regulate the other device. A driver may reside in an application program or operating system to control a particular device, such as a printer, disk drive, or other types of devices. In many cases, a driver may also manipulate the hardware of the system to transmit data to and from a device. The term "driver", as used herein, refers to a program within an application program to control communications with a service provider, a financial institution's computer, and/or other devices and networks to support the use of on-line services.

One problem associated with on-line banking services is that the ISC and Visa Interactive service providers (as well as the BTX and Minitel service providers) each have unique protocols and rules of operation that are determined by the service provider rather than the banks. These protocols and rules may not be desirable to all banks that wish to support on-line services and, therefore, certain banks may decide against utilizing ISC or Visa Interactive as their service providers. In this case, a bank may be required to set up its own method of connection with an application program and may provide its own set of business rules that relate to how on-line banking services are performed.

An application program must have certain information to be able to connect to a financial institution that supports on-line services. Various methods may be used for providing an application program with this information. One method is to store information on product disks that are sold with the application program disks. These product disks are generally loaded onto the user's computer concurrently with the application program. However, the information relating to financial institutions is dynamic and changes often. For example, additional financial institutions may decide to support on-line services and/or change the connection method after the product disks have been shipped. Therefore, the financial institution information on product disks may quickly become out-of-date and inaccurate between the time the information is put on the disks and the time the user wishes to use the information to connect to a financial institution. Additionally, storing financial institution information on product disks and shipping these disks with the application program can result in increased costs and can require the user to devote storage space on the user's computer to store this information. Thus, it is disadvantageous to provide information regarding financial institutions on product disks.

Another method includes storing a single large database file on a server that includes a list of all participating financial institutions and corresponding connection methods associated with each financial institution. Upon request, the entire database file can then be downloaded to the user's computer and searched for information relating to a particular financial institution. However, it will be appreciated that the list of participating financial institutions and each institution's corresponding connection method can form a voluminous database. Because the HTTP protocol used in connection with web servers typically requires the downloading of entire files, this method is inefficient.

Another method includes using a script or other server-side intelligence to search a database file on a server for information regarding a specific financial institution that is of interest. However, this method has the disadvantage of requiring a development effort to create server-side intelligence that does not presently exist.

The large number of financial institutions that support on-line services can make the application program's job of connecting to any one of the institutions quite difficult. Therefore, a need exists for an interface that allows an application program to support the multiple formats that may be used in providing on-line banking services.

Regarding the transfer, or importation, of a file containing financial information at a financial institution relating to a user of the application program, prior methods have required the user to request that the financial information, such as a monthly account statement, be downloaded from the financial institution to the application program that the user is using. This is undesirable for several reasons, primarily because of the requirement that the user issue a request to the application program to obtain the information from the financial institution. Therefore, without user intervention, the information will not be imported to the application program.

Furthermore, financial institutions may prefer that the user of an application program log on to the institution's web site to conduct on-line services rather than connect to the institution's server via a service provider as shown in FIGS. 1A and 1B. Financial institutions may prefer that on-line services be conducted via the institution's web server because the institution has more control over the web site and can more readily control the on-line activities that occur through the web site. When the application program connects to a server at the financial institution via a service provider as shown in FIGS. 1A and 1B, the on-line activities are controlled mainly by the application program rather than the server associated with the institution. This lack of control of the on-line activities may be looked upon with disfavor by financial institutions.

SUMMARY OF THE INVENTION

The present invention provides an improved method of importing a bank file from the financial institution's computer to the application program, A bank file stored on the bank's computer is imported automatically into the application in accordance with the invention, thus eliminating the requirement of user intervention to request the application program to locate the file at a local storage medium.

In accordance with the present invention, the local program obtains a bank file from the financial institution's server. A second file based on the bank file is created by the server associated with the financial institution. The local program writes the second file to the disk of the local storage medium and then invokes a "Shell_Execute" API from the operating system. The application program automatically, without user intervention, transfers the file directly from the local storage medium into the application program. Thus, the importation of a bank file to the application program is transparent to the user and enables a clever, less confusing user interface.

In another embodiment, the local program is a web browser. The bank file that is displayed to the user via the web site may include a button on the user's screen that is a link on the bank's server that points to the second file. If the user selects the button associated with the link, the web browser automatically invokes the "Shell_Execute" API and the application program is invoked and the file is imported directly to the application program, thus bypassing the local storage medium. Therefore, the use of the application program can be initiated when the user has accessed the financial institution's web site and the application program may perform file importation upon selection by the user of a predetermined function at the institution's web site.

DETAILED DESCRIPTION

Figure 1A:
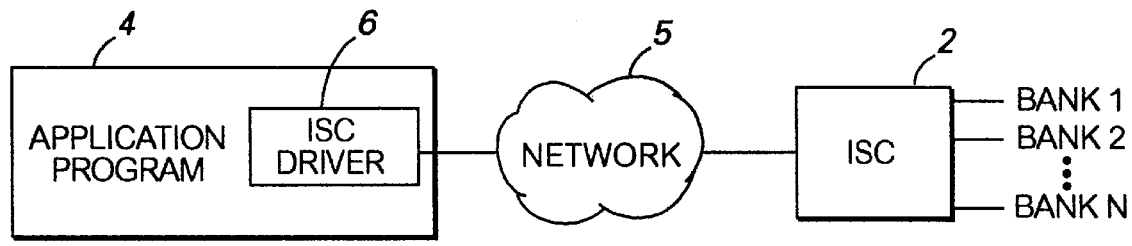
FIGS. 1A and 1B are block diagrams of prior methods of connecting an application program to a service provider for connecting to financial institutions for utilizing on-line banking services.

The present invention is directed to a method and system for the importation of a file containing financial information from a financial institution to an application program. A bank file stored on the institution's computer is imported automatically into the application in accordance with the invention, thus eliminating the requirement of user intervention to request the application program to locate the file at a local storage medium.

Although the preferred embodiment will be generally described in the context of an application program and an operating system running on a personal computer, those skilled in the art will recognize that the present invention also can be implemented in conjunction with other program modules for other types of computers. Furthermore, those skilled in the art will recognize that the present invention may be implemented in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet. Accordingly, it will be understood that the terms computer, operating system, and application program generally include all types of computers and the program modules designed for them.

Turning first to the nomenclature of the specification, the detailed description which follows is represented largely in terms of processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. Each of these conventional distributed computing components is accessible to the local processing unit by a communication network.

The processes and operations performed by the computer include the manipulation of data bits by a local processing unit or remote server and the maintenance of these bits within data structures resident in one or more of the local or remote memory storage devices. These data structures impose a physical organization upon the collection of data bits stored within a memory storage device and represent specific electrical or magnetic elements. Symbolic representations are the means used by those skilled in the art of computer programming and computer construction to most effectively convey teachings and discoveries to others skilled in the art.

For the purposes of this discussion, a process is generally defined as being a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general purpose digital computers or other similar computing devices.

In addition, it should be understood that the programs, processes, method, etc. described herein are not related or limited to any particular computer or apparatus nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Figure 2:
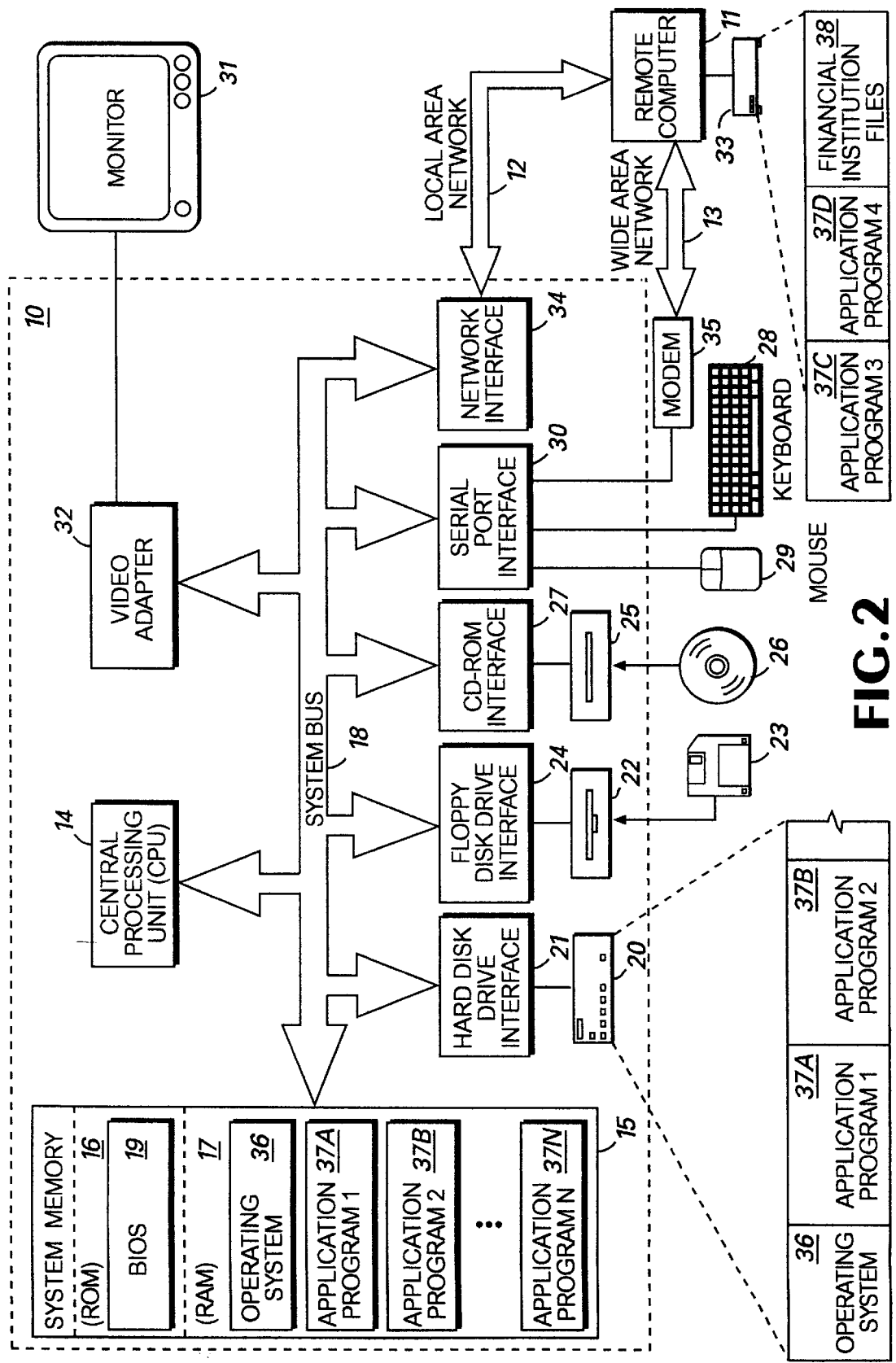
FIG. 2 is a first block diagram of a computer system representing the operating environment for a preferred embodiment of the present invention.

Turning now to the drawings, in which like numerals indicate like elements throughout the several figures, FIG. 2 illustrates a computer system on which the preferred embodiment of the present invention is implemented. As shown in FIG. 2, the computer 10 is in a networked environment with logical connections to a remote computer 11. The logical connections between the computer 10 and the remote computer 11 are represented by a local area network 12 and a wide area network 13. Those of ordinary skill in the art will recognize that in this client/server configuration, the remote computer 11 may function as a file server or computer server.

The computer 10 includes a central processing unit 14, such as the 80486 or "PENTIUM" microprocessors manufactured by Intel Corporation of Santa Clara, Calif. The processing unit 14 is not limited to an Intel-model processor, and can be implemented by other processors such as a member of the MIPS family by Silicon Graphics, Inc. or a PowerPC processor by Motorola Corporation. The computer also includes system memory 15, including read only memory (ROM) 16 and random access memory (RAM) 17, connected to the processing unit by the system bus 18. The BIOS 19 for the computer 10 is stored in ROM 16. Those skilled in the art will recognize that the BIOS 19 is a set of basic routines that helps to transfer information between elements within the computer 10.

Within the computer 10, a local hard disk drive 20 is connected to the system bus 18 via the hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the computer 10 by using a keyboard 28 and/or pointing device, such as a mouse 29, which are connected to the system bus 18 via a serial port interface 30. Other types of pointing devices may include track pads, track balls, data gloves, head-trackers, pens, and other devices suitable for positioning a cursor on a computer monitor 31. The computer monitor 31 includes a pixel-oriented computer screen 31a on which images are displayed. The monitor 31 or other kind of display device is connected to the system bus 18 via a video adapter 32.

Figure 1B:
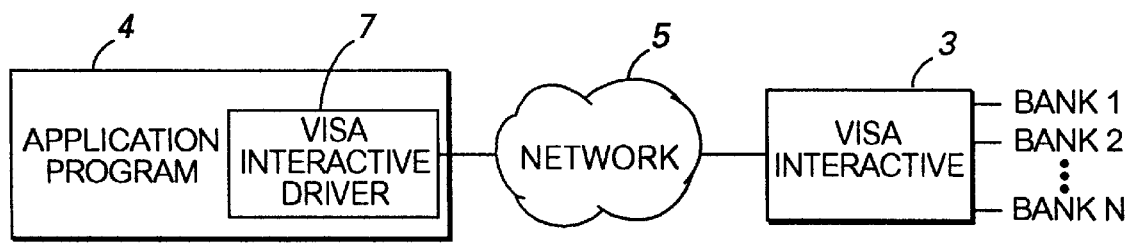

The remote computer 11 in the networked environment shown in FIG. 1 is connected to a remote memory storage device 33. This remote memory storage device 33 is typically a large capacity device such as a hard disk drive, CD-ROM drive, magneto-optical drive or the like. In accordance with the present invention, the remote memory storage device 11 may be called the branding and directory server (hereinafter, the "branding server") that stores files 38 associated with specific financial institutions. These files 38 contain information relating to particular financial institutions, as will be described further below.

The computer 10 is connected to the remote computer 11 by a network interface 34, which is used to communicate over the local area network 12. As shown in FIG. 2, the computer 10 may also be connected to the remote computer 11 by a modem 35, which is used to communicate over the wide area network 13, such as the Internet. The modem 35 is connected to the system bus 18 via the serial port interface 30. Typically, the modem 35 is also connected to a communications network such as the public switched telephone network (PSTN) or a community antenna television network (CATV). Although illustrated in FIG. 2 as external to the computer 10, those of ordinary skill in the art wilt recognize that a modem 35 may also be internal to the computer 10, thus communicating directly via the system bus 18. It is important to note that connection to the remote computer 11 via both the local area network 12 and the wide area network 13 is not required, but merely illustrates alternative methods of providing a communication path between the computer 10 and the remote computer 11.

Although many other internal components of the computer 10 are not shown, those of ordinary skill in the art will appreciate that such components and the interconnection between them are well known. Accordingly, additional details concerning the internal construction of the computer 10 need not be disclosed in connection with the present invention. It should also be understood that the components and operation of computer 10, as described in FIG. 2, may also be provided within remote computer 11.

Those skilled in the art will understand that program modules such as an operating system 36, application programs 37, and data are provided to the computer 10 via one of the local or remote memory storage devices, which may include the local hard disk drive 20, floppy disk 23, CD-ROM 26, RAM 17, ROM 16, and the remote memory storage device 33. In the preferred computer 10, the local hard disk drive 20 is used to store data and programs, including the operating system and application programs. The program module or application programs 37 preferably include a program that supports on-line banking services.

In accordance with the preferred embodiment of the present invention, a user can cause computer 10 to run an application program that supports on-line banking services between a financial institution and the computer 10. It should be noted that the present invention is not limited merely to on-line services relating to banking, but can be adapted to be implemented in a wide range of on-line services in many different fields.

An aspect of the present invention relates to the downloading of information containing financial information relating to a user, hereinafter called a "bank file", from a financial institution's computer to the application program running on the user's computer. It should be understood that the bank file may include many different types of documents or information, including, e.g., account statements. A prior method of downloading a bank file is shown in FIG. 3.

Figure 3:
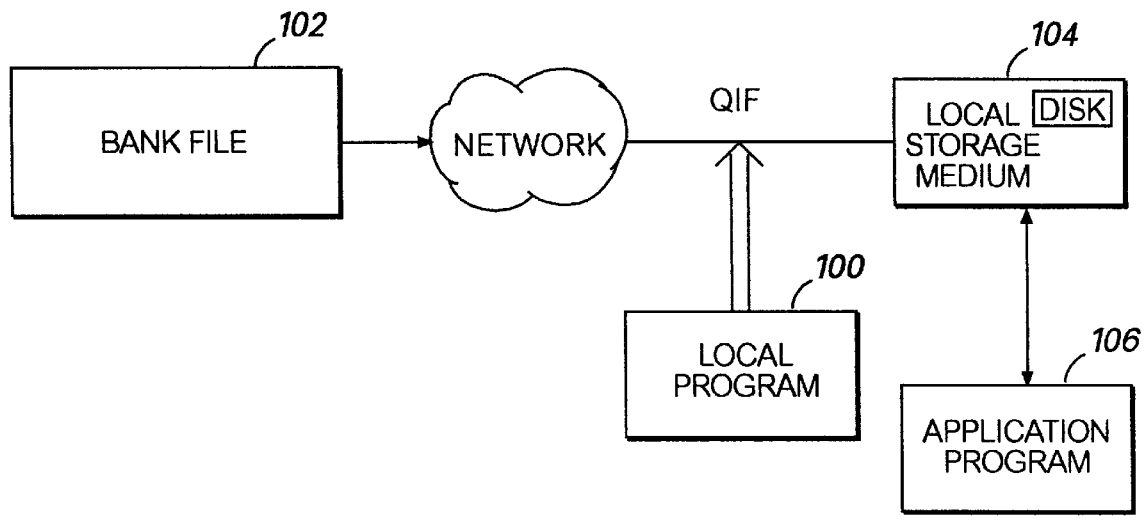
FIG. 3 is a block diagram showing a prior method of transferring a bank file from a bank server to an application program.

In the block diagram of FIG. 3, a bank file is transferred, or "imported", from the bank's computer to the application program running on the user's computer using the Quicken Import Format (QIF). The QIF is well-documented and is supported by most personal software products on the market today.

In the prior method of importation, a local program 100 is used to connect to the bank's computer 102 and export the file using the QIF format to a local storage medium 104, where the file is stored on disk. The user must then request the application program 106 to access the local storage medium, locate the QIF file on the disk of the local storage medium 104, and then import the file into the application program.

This prior method is tedious and requires user intervention in order to import the file, which results in an undesirable user interface. Having once imported the file into the application program, the user must remember not to import it a second time or duplicate entries will result. Undesirable duplication of transactions can also occur because it is common for users to manually enter transactions in the application program. For instance, when a user writes a check, the user will typically record the check in the user's account in the application program so that the user's account balance is current. Typically, when downloading a user's account statement after the check clears the bank, the application program will identify the downloaded transaction as the same as the manually-entered transaction and will not duplicate the transaction. A method of identifying and preventing duplicate transactions is described in pending U.S. patent application Ser. No. 08/701,444 entitled "Automatic Recognition of Periods for Financial Transactions", filed on Aug. 22, 1996, which is hereby incorporated by reference. The identification of duplicate transactions does not occur in QIF importing, thus, duplicate transactions may result using QIF importing if the user has manually entered any transactions.

Additionally, the QIF file does not identify the user's account, so the user must identify the account relating to the QIF file each time the user imports the QIF file. Therefore, the possibility of user error in entering the user's account number exists which will cause user transactions to be loaded into the incorrect file. It is therefore apparent that the prior method of downloading bank files is problematic.

Figure 4:
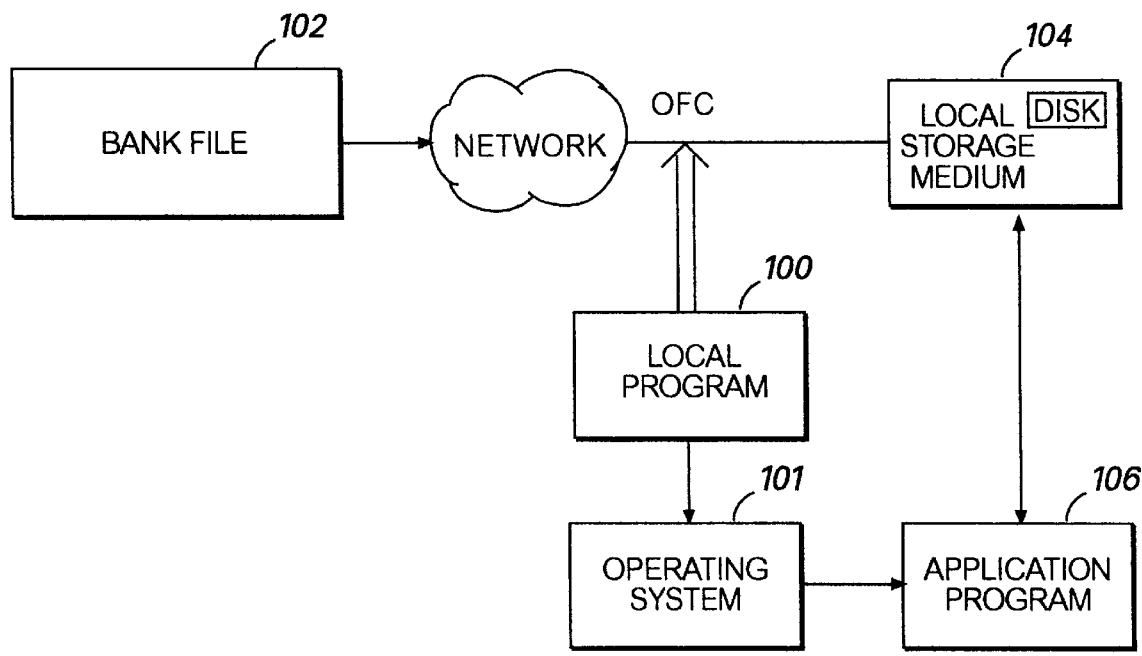
FIG. 4 is a block diagram showing a method of transferring a bank file from a bank server to an application program, in accordance with an embodiment of the present invention.

The present invention provides an improved method of importing a bank file from the bank's computer to the application program, as will be described below with reference to FIG. 4. A bank file stored on the bank's computer is imported automatically into the application in accordance with the invention, thus eliminating the requirement of user intervention to locate the file at the local storage medium.

In accordance with the present invention, the local program 100 obtains a bank file 102 from the financial institution's server. A second file based on the bank file is created by the server associated with the financial institution. For the purposes of this description, the second file will be called the "OFC file". The local program 100 writes the OFC file to the disk of the local storage medium 104 and then invokes a "Shell_Execute" API from the operating system 101. The application program 106 informs the operating system 101 that the application program handles OFC files. The application program then automatically, without user intervention, transfers the OFC file directly from the local storage medium 104 into the application program 106. Although the file is actually written to the disk of the local storage medium, the "Shell_Execute" API causes the operating system to allow the application program to transfer the file from the disk of the local storage medium to the application program. Thus, the importation of a bank file to the application program is transparent to the user and enables a clever, less confusing user interface.

In another embodiment, the local program is a web browser. The bank file that is displayed to the user, such as a monthly statement, can include a button on the user's screen that is a link on the bank's server that points to the OFC file. Thus, if the user selects the button associated with the link, the web browser automatically invokes the "Shell_Execute" API and the OFC file is imported directly to the application program, thus bypassing the local storage medium. Therefore, the use of the application program can be initiated when the user has accessed the financial institution's web site and the application program may perform file importation upon selection by the user of a predetermined function at the institution's web site.

As discussed above, this is desirable to the institution because the institution can more readily maintain control of the on-line services initiated and performed via its web site. Furthermore, importation of a bank file as described above is advantageous to the user of the application program because the bank file is imported into the application program without the user having to specifically request the application to perform the importation. The user merely logs on to the institution's web site, selects a button or function associated with the importation of the bank file provided by the web site, and the application program is automatically invoked and automatically performs the importation with no further action required by the user.

In accordance with the present invention, it should be understood that the application program must register the file type with the operating system as a type belonging to the application program. For example, a word processing program such as MICROSOFT WORD informs the operating system that MICROSOFT WORD owns all files of the type identified by the suffix ".doc". If the user of the word processing program clicks on a file identified by the suffix ".doc", the operating system would launch the MICROSOFT WORD application program with the file. Similarly, the user of an application program which embodies the present invention may click on a file identified in the web browser by the suffix ".ofc". This allows the browser to call the operating system to inform the operating system that the application program is to be launched with the ".ofc" file. The application program that embodies the present invention includes code to allow the application program to identify the file as an import of a bank statement.

It should also be understood that the term "bank file", as used herein, may include a wide range of information maintained at a financial institution that is accessible by the application program. The present invention may be used to perform various activities relating to various information stored in a bank file. Such activities include downloading bank statements, downloading brokerage statements, downloading paychecks, mortgage payment updates, and other similar transactions. Also, when a user makes a transaction at a web site, the web site can export an OFC file containing the details of the transaction into the application program. It should be understood that the present invention as described above supports the use of "one-way" connections, such that the server prepares a file stored on the server and transmits it to the application program without first receiving a request from the application to transmit the file.

Furthermore, it should be understood that, in accordance with the present invention described above, the application program treats the imported file as a home banking statement, rather than as a simple import file. An advantage of this is that the statement appears in the "home banking" portion of the application program's user interface, with which the user is presumably most familiar. Allowing the statement to be more closely tied to the bank than an import file is advantageous because providing the statement such that it appears to be offered by the bank (rather than by the software company that manufactures the application program) generates goodwill among banks and encourages banks to provide support to the application program by providing user account data to the program.

Additionally, the home banking system includes code to detect duplicate transactions, both when the same file is downloaded twice and when the user has previously manually entered transactions. Also, identifying the user's account in the file, as discussed above, permits the application program to better associate the imported file with a specific account than can be done using QIF.

From the foregoing, it will be appreciated that the disclosed embodiment of the present invention overcomes the drawbacks of the prior art described hereinabove. From the description of the disclosed embodiment, equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. A method for transferring a bank file stored on a server associated with a financial institution to an application program running on a client computer, comprising:

creating a second file based on the bank file, said step of creating being performed by the server associated with the financial institution;

writing the second file to a local storage medium;

calling the operating system; and the operating system causing the application program to transfer the second file from the local storage medium to the application program without user intervention.

2. The method of claim 1 wherein said step of writing is performed by a local program.

3. The method of claim 2 wherein the local program is a web browser.

4. A method for transferring financial data from a server to an application program running on a client computer, such financial data being associated with a user of an application program, said method comprising the steps of:

creating a file based on such financial data, said step of creating being performed by the server;

writing the file to a local storage medium;

calling the operating system; and the operating system causing the application program to transfer the file from the local storage medium to the application program without user intervention.

5. The method of claim 4 wherein said step of writing is performed by a local program.

6. The method of claim 5 wherein the local program is a web browser.

7. A method for transferring a bank file from a server associated with a financial institution to an application program on a client computer using a server process on the server and a local process on the client computer, wherein the application program is associated with a predetermined file type, comprising the steps of:

creating, by the server process, a second file of the predetermined file type based on the bank file; and importing, by the local process, the second file into the application program by:
  receiving the second file from the server; and
  launching the application program so that the application program accesses the second file without user intervention.

8. The method of claim 7, wherein the local process is a browser.

9. The method of claim 7, further comprising the steps of:
  storing, by the local process, the second file to a local storage medium of the client computer; and
  accessing, by the application program, the second file from the local storage medium.

10. The method of claim 7, wherein the application program treats the second file as a home banking statement so that the second file is displayed in a format that is associated with the financial institution.

11. The method of claim 7, wherein the second file includes an account number identifying an account at the financial institution.

12. A home banking system that implements a method for transferring a financial file associated with an account at a financial institution and stored on a server associated with the financial institution to an application program on a client computer, comprising:
  a server process on the server that creates a second file of a predetermined file type based on the financial file and sends the second file to the client computer; and
  a local process on the client computer that imports the second file into the application program by:
    receiving the second file from the server process; and
    launching the application program so that the application program accesses the second file without user intervention.

13. The home banking system of claim 12, wherein the local process is a browser.

14. The home banking system of claim 12, wherein the local process stores the second file on a local storage medium of the client computer.

15. The home banking system of claim 12, wherein the application program is associated with the predetermined file type by registering with an operating system of the client computer and wherein the step of launching the application program comprises calling the operating system and requesting that the application program be launched with the second file.

16. A method for importing a bank file associated with an account at a financial institution and stored on a server associated with the financial institution into an application program on a client computer, comprising:
  displaying the bank file on a display device of the client computer;
  receiving a request to import the bank file into the application program; and
  importing the bank file into the application by:
    receiving a second bank file that is based on the bank file from the server, the second bank file having a predetermined file type that is associated with the application program; and
    automatically launching the application program so that the application program accesses the second bank file.

17. The method of claim 16, wherein the step of importing the bank file into the application further comprises the step of:
  storing the second bank file on a local storage medium of the client computer.

18. The method of claim 16, wherein the application program registers the predetermined file type with an operating system of the client computer so that the application program is associated with the predetermined file type.

19. The method of claim 16, wherein the second bank file includes an account number identifying the account at the financial institution.

\* \* \* \* \*